(12) United States Patent
Beaudin et al.

(10) Patent No.: US 8,204,544 B2
(45) Date of Patent: Jun. 19, 2012

(54) AGILE REMOTE RADIO HEAD

(75) Inventors: Steve Beaudin, Nepean (CA); Feng Gao, Calgary (CA); David Tholl, Calgary (CA); Mihai Parvan, Gloucester (CA); J. Bradley DeForge, Chelsea (CA)

(73) Assignee: Rockstar Bidco, LP, New York, NY (US)

( * ) Notice: Subject to any disclaimer, the term of this patent is extended or adjusted under 35 U.S.C. 154(b) by 1038 days.

(21) Appl. No.: 12/139,591

(22) Filed: Jun. 16, 2008

(65) Prior Publication Data

US 2009/0247092 A1  Oct. 1, 2009

Related U.S. Application Data

(60) Provisional application No. 61/039,880, filed on Mar. 27, 2008.

(51) Int. Cl.
*H04M 1/00* (2006.01)
*H04B 1/38* (2006.01)

(52) U.S. Cl. ........... 455/561; 455/67.11; 455/67.13; 455/68; 455/69

(58) Field of Classification Search .......... 455/423–425, 455/67.11, 67.13–67.16, 67.7, 68–69, 522, 455/561
See application file for complete search history.

(56) References Cited

U.S. PATENT DOCUMENTS

| | | | | |
|---|---|---|---|---|
| 5,805,666 A | * | 9/1998 | Ishizuka et al. | 379/1.01 |
| 6,088,588 A | * | 7/2000 | Osborne | 455/425 |
| 6,141,565 A | * | 10/2000 | Feuerstein et al. | 455/560 |
| 6,167,031 A | * | 12/2000 | Olofsson et al. | 370/252 |
| 6,308,071 B1 | * | 10/2001 | Kalev | 455/446 |
| 6,567,375 B2 | * | 5/2003 | Balachandran et al. | 370/204 |
| 6,810,236 B2 | * | 10/2004 | Terry et al. | 455/67.11 |
| 7,092,672 B1 | * | 8/2006 | Pekonen et al. | 455/67.11 |
| 7,206,355 B2 | | 4/2007 | McGowan et al. | |
| 7,286,854 B2 | * | 10/2007 | Ferrato et al. | 455/562.1 |
| 7,583,975 B2 | * | 9/2009 | Stephens et al. | 455/522 |
| 7,596,090 B2 | * | 9/2009 | Black | 370/234 |
| 2006/0223515 A1 | | 10/2006 | Hermel et al. | |
| 2007/0160012 A1 | | 7/2007 | Liu | |

FOREIGN PATENT DOCUMENTS

| | | |
|---|---|---|
| EP | 1890390 A1 | 2/2008 |
| WO | 0193615 A1 | 12/2001 |

OTHER PUBLICATIONS

Dinan, Esmael, et al., "UMTS radio interface system planning and optimization," Bechtel Telecommunications Technical Journal, 2002, vol. 1, No. 1, pp. 1-9.

Foreign communication from a related counterpart application—International Search Report and Written Opinion, PCT/CA2009/000352, Jun. 17, 2009, 14 pages.

(Continued)

*Primary Examiner* — Tuan A Tran
(74) *Attorney, Agent, or Firm* — Conley Rose, P.C.; Rodney B. Carroll; Bernard Tiegerman (57) ABSTRACT

A system for providing wireless communication is provided. The system comprises a radio transceiver comprising a plurality of configurable receivers and transmitters and a programmable processor, wherein the programmable processor is operable to configure at least some of the plurality of receivers and transmitters to operate using an operational mode associated with at least one of a designated coverage area and capacity.

20 Claims, 9 Drawing Sheets

OTHER PUBLICATIONS

Hyun, Seungheon, et al., "The SDR forum smart antenna API: A standardized interface for smart antenna systems," Antenna Systems & Technology, 2008, pp. 18-19, www.antennasonline.com.

Tong, Wen, et al., "True broadband multimedia experience," IEEE Microwave Magazine, 2008, vol. 9, No. 4, pp. 64-71.

Elmer-Dewitt, Philip, "Fatal bandwidth: 6 cell tower deaths in 5 weeks," http://apple20.blogs.fortune.cnn.com/2008/05/28fatal-bandwidth-6-cell-tower-deaths-in-5, May 28, 2008, 2 pages, Fortune: Apple 2.0.

Provisional application entitled "Agile Remote Radio Head," by Steve Beaudin, et al., filed Mar. 27, 2008, as U.S. Appl. No. 61/039,880.

Schonfeld, Erick, "Cell-tower fatalities: 3G iPhones at any price?" http://seekingalpha.com/article/79187-cell-tower-fatalities-3g-iphones-at-any-price?source, May 28, 2008, 1 page, Seeking Alpha.

* cited by examiner

AGILE REMOTE RADIO HEAD

CROSS-REFERENCE TO RELATED APPLICATIONS

The present disclosure is related to and claims the priority of U.S. Provisional Patent application No. 61/039,880, entitled "Agile Remote Radio Head," by Steve Beaudin et al., filed Mar. 27, 2008, which is incorporated by reference herein for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates generally to radio heads and, more particularly, to a device and method for changing the capacity and range of agile radio heads.

BACKGROUND OF THE INVENTION

Wideband transceivers typically contain both transmitters and receivers. Transmitters are used to take a signal from a communication device, generate a high power signal (e.g., amplify the signal) that can be transmitted from the communication device to a destination, and then propagate the signal away from the transmitter to the destination. Receivers take a signal that has been transmitted from a destination and pass the signal to the communication device.

One of the problems with existing communication systems is that communication systems may have a fixed capacity and range. Changes to the capacity or range of communication systems may require hardware changes to the communication systems. These hardware changes are expensive and time consuming, particularly when they concern changes to base station hardware, as heavy lift equipment and/or dangerous ascents of base station towers can be required.

When communication systems are initially installed, there may be a need for maximizing the coverage area of the communication system. As the number of subscribers increases and additional communication systems are installed, there may be a shift away from a need for coverage area to a need for increased capacity. Adapting the system to support these changed needs may generally require costly hardware installations, network downtime, and lease renegotiations. Similarly, even in the same network infrastructure deployment phase, in some locations there may be a greater need for higher capacity than for greater range.

SUMMARY OF THE INVENTION

In an embodiment, a system is disclosed. The system comprises a radio transceiver comprising a plurality of configurable receivers and transmitters and a programmable processor, wherein the programmable processor is operable to configure at least some of the plurality of receivers and transmitters to operate using an operational mode associated with at least one of a designated coverage area and capacity.

In another embodiment, a method for configuring a radio head is disclosed. The method comprises selecting an operation mode for a radio head from a prescribed set of operation modes or operation parameters for at least some of a plurality of transmitters and receivers associated with the radio head and inputting the operation mode into the radio head to direct a change in one or more of radio head capacity, range or transmission mode.

In another embodiment, a method for configuring a radio head is disclosed. The method comprises operating a first radio head with a first operational mode, wherein the first operational mode has a first range and a first coverage area and detecting a change in operational conditions. The method also comprises compensating for the change in operational conditions by selecting a second operational mode and operating the first radio head with the second operational mode, wherein the second operational mode has a second range and a second coverage area.

These and other features will be more clearly understood from the following detailed description taken in conjunction with the accompanying drawings and claims.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents. It is further understood that as used herein, terms such as "coupled," "connected," "electrically connected," "in signal communication," and the like may include direct connections between components, indirect connections between components, or both, as would be apparent in the overall context of a particular embodiment. The term "coupled" is intended to include, but not be limited to, a direct or indirect electrical connection. The terms pass, passing, transmit, transmitted, or transmitting is intended to include, but not be limited to, the electrical transmission of a signal from one device to another. In some embodiments, the present disclosure also contains embodiments directed at waveforms of a complex nature (real and imaginary components) as commonly used in digital modulation schemes such as Phase-shift Keying (mPSK) and Quadrature Amplitude Modulation (mQAM), wherein the 'm' in both mPSK and mQAM is any integer. In some other embodiments, the present disclosure also contains embodiments directed to systems employing scalar signals.

Figure 1:
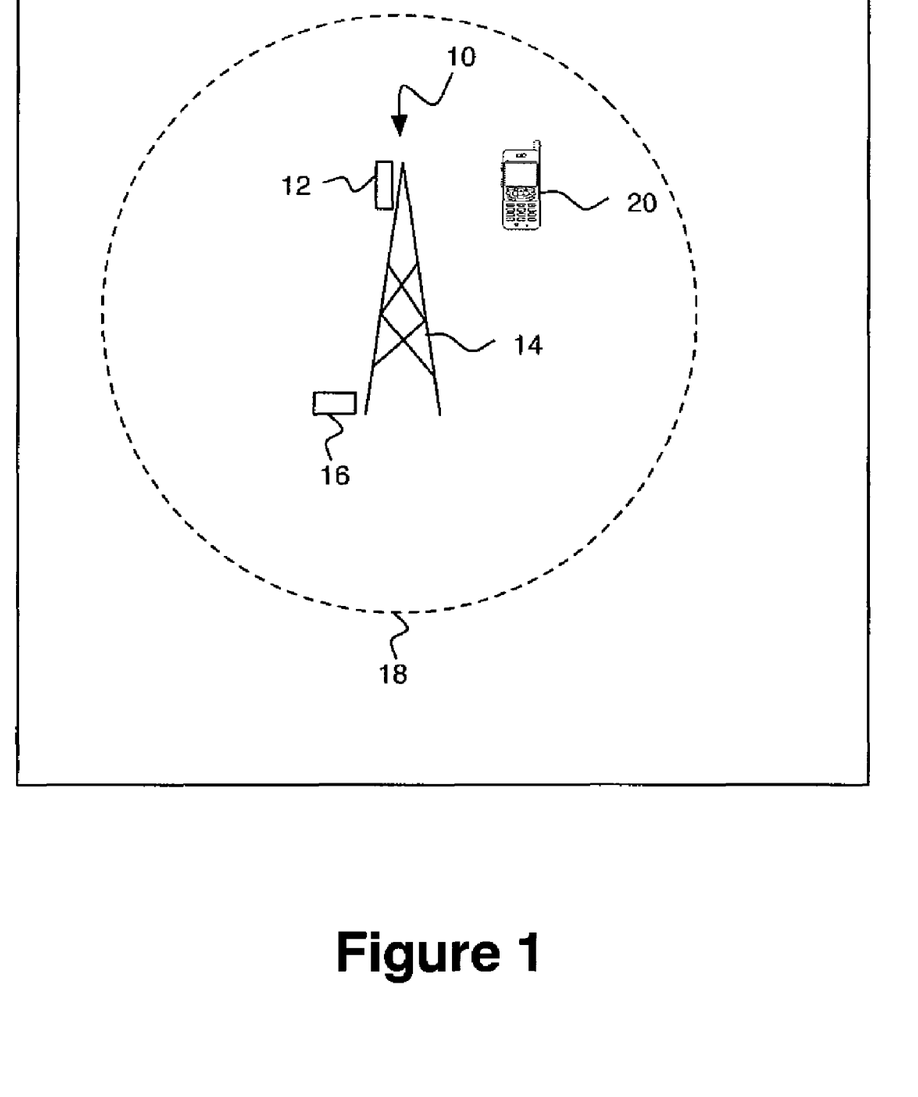
FIG. 1 is a block diagram of one embodiment of a system comprising an agile radio head.

As shown in FIG. 1, the present disclosure contemplates an agile remote radio head system 10 comprising an agile radio head 12 mounted on a communication tower 14 and having a service area defined by a boundary or range 18. The agile radio head 12 is in communication with a modem 16 and a communication device 20, which may be mobile or stationary. It is understood that the agile radio head 12 may also be in communication with a plurality of mobile and/or stationary devices, and the single, mobile communication device 20 is shown for illustrative purposes with the understanding that multiple mobile and/or stationary devices can be used in the various embodiments disclosed herein. One of the innovative features of the agile radio head 12 is that the agile radio head 12 can be reconfigured through software to extend range 18 or increase the capacity (e.g., the number of mobile and/or stationary devices that can communicate with agile radio head 12) which can be supported by agile radio head 12 and modem 16. Since the operation of the agile radio head 12 may be adapted through software, reconfiguration does not require tower climbs, rental or deployment of infrastructure lifting equipment to transfer cellular infrastructure to/from the radio head 12, additional hardware, or lease renegotiations.

Agile radio head 12 of the present invention is a software reconfigurable radio head with a plurality of transmitters and receivers. It is explicitly understood that the agile radio head 12 may have any number of transmitters and receivers. These transmitters and receivers may be configured in any way disclosed herein, and the examples of the configurations discussed herein are for exemplary purposes only. For the sake of clarity, three agile radio head 12 operational profiles or modes will be discussed. Agile radio operational mode one is a maximum coverage area mode. Agile radio operational mode two is a maximum capacity mode. Agile radio operational mode three is a specialized multiple input multiple output (MIMO) or beam forming configuration. It is explicitly understood that any operational mode may be programmed into an agile radio head, and any reprogramming of a radio head to alter the coverage and/or capacity of the radio head is within the intended scope of this disclosure. Moreover, while a symmetrical coverage area is depicted, it is expressly understood that asymmetrical coverage areas are contemplated by the invention.

Communication tower 14 is depicted as a tower, but it is expressly understood that communication tower 14 could be any structure on which the agile radio head 12 may be mounted. Examples of alternative locations that the agile radio head 12 may be mounted to include, but are not limited to, buildings, other types of towers (e.g. water towers), or other locations suitable for mounting the agile radio head 12. Communication tower 14 may provide for communication between the modem 16 and the agile radio head 12 as well as power for the agile radio head 12 and modem 16, for example via wires or cables.

Communication device 20 is any device capable of sending or receiving any kind of signal, including analog and digital signals. It is expressly contemplated that communication device 20 may contain components substantially similar to those found in a mobile terminal or handset, a mobile telephone base station, a computer, or any other device capable of creating, altering, sending, or receiving signals. It is further contemplated that one or more communication devices may be present consistent with communication device 20. For instance, communication device 20 may actually compose two or more separate devices, such as a signal generator and a signal receiver.

While the agile radio head 12, the communication tower 14 and the modem 16 are illustrated as separate devices, it is expressly understood that they may be integrated into a single device. For instance, a communication tower may have agile radio head 12, communication tower 14 and modem 16 integrated into a single housing. The scope of this disclosure should not be limited by the illustrative representation of agile radio head 12, communication tower 14 and modem 16 as separate devices.

Figure 2:
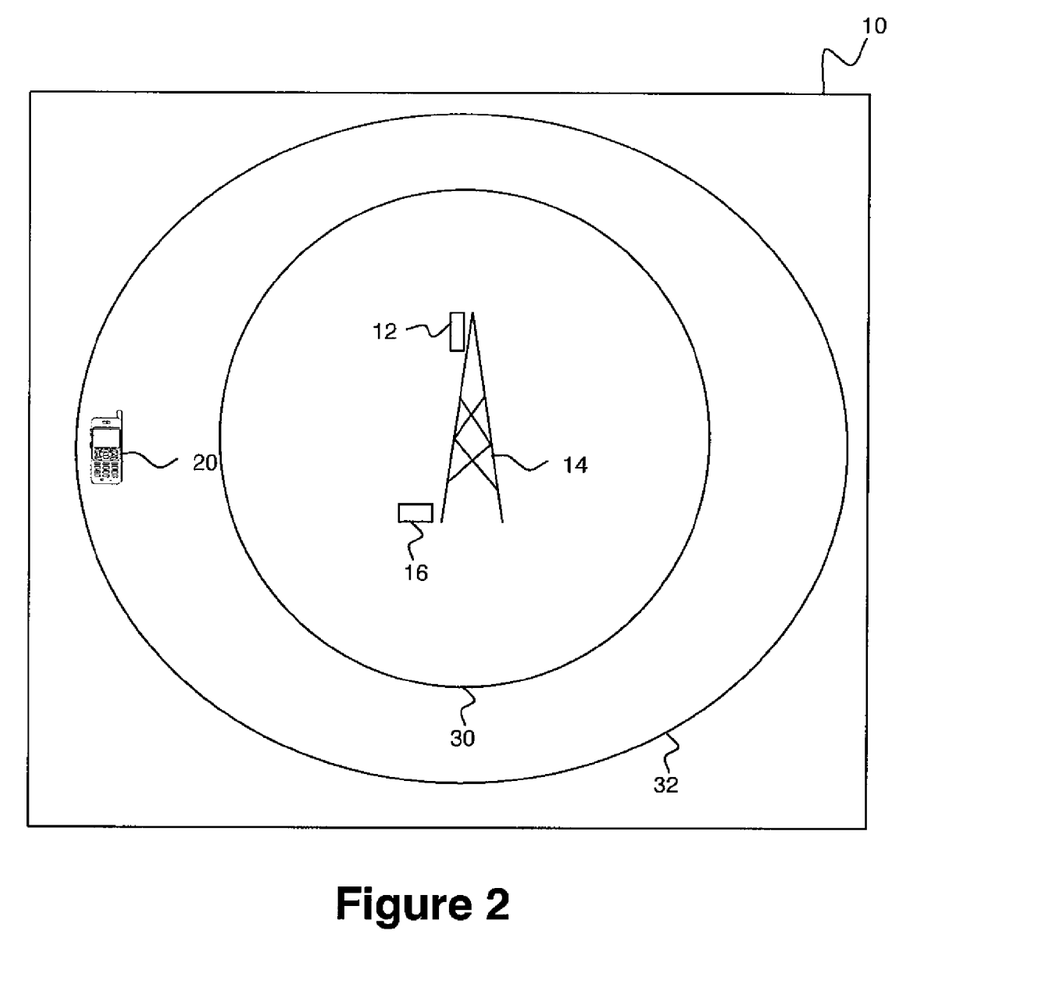
FIG. 2 is a block diagram of a system with an agile radio head illustrating two operational modes.

FIG. 2 illustrates the agile radio head 12 having two operational modes, the first operational mode with a first coverage range 30 and the second operational mode with a second coverage range 32. This example illustrates that the range of the agile radio head can be configured to have different coverage areas depending upon the software configuration of the agile radio head 12. In the example shown in FIG. 2, the communication device 20 may be outside of the first coverage range 30 but within the second coverage range 32. It is understood that the coverage area may be changed through the operational mode of the agile radio head 12.

Embodiments of the present disclosure can be used in conjunction with a variety of antenna technologies. These technologies include, by way of non-limiting example, multiple-input and multiple-output ("MIMO"), beam forming and diversity combining systems. MIMO systems seek to increase system capacity in a given channel bandwidth by transmitting different data streams on orthogonal spatial modes that may exist between the radio head 12 and communication device 20. Beam forming is a means of increasing capacity through spatial multiplexing. Beam forming may be fixed, wherein a group of transceivers are connected to an antenna array through a beam former, or may be adaptive, wherein the transceivers are phased appropriately by the baseband processing in the radio head 12 and/or the modem 16. Diversity combining is a means of improving sensitivity by summing in phase the incoming signal from different antennas receiving from a common direction. Forms of diversity combining may include, for example, Maximal Ratio Combining (MRC). Multi-carrier operation may be achieved by a single transmitter or, alternatively, multiple transmitters exciting two or more carriers at different frequencies. Multi-carrier operation uses more bandwidth, and as a result, the capacity of the system is proportional to the number of carriers used.

In an embodiment, the agile remote radio head system 10 leverages the trend towards including additional numbers of transmitters and receivers into 4G radios, as demand for higher capacity drives MIMO, by promoting dynamic configuration of the agile remote radio head system 10 for either improved coverage or increased capacity by using groups of transceivers in either a MIMO, a beam forming, a multi-carrier, or a diversity scheme and/or mode. For example, if a radio having 4 transmitters and 4 receivers is available that can support 4×4 MIMO, the transmitters may be leveraged by pooling their power to fewer than 4 outputs to provide higher downlink power and hence improved coverage. Similarly, the receivers can be grouped and different forms of combining used to improve the sensitivity of the agile remote radio system head system 10.

Figure 3:
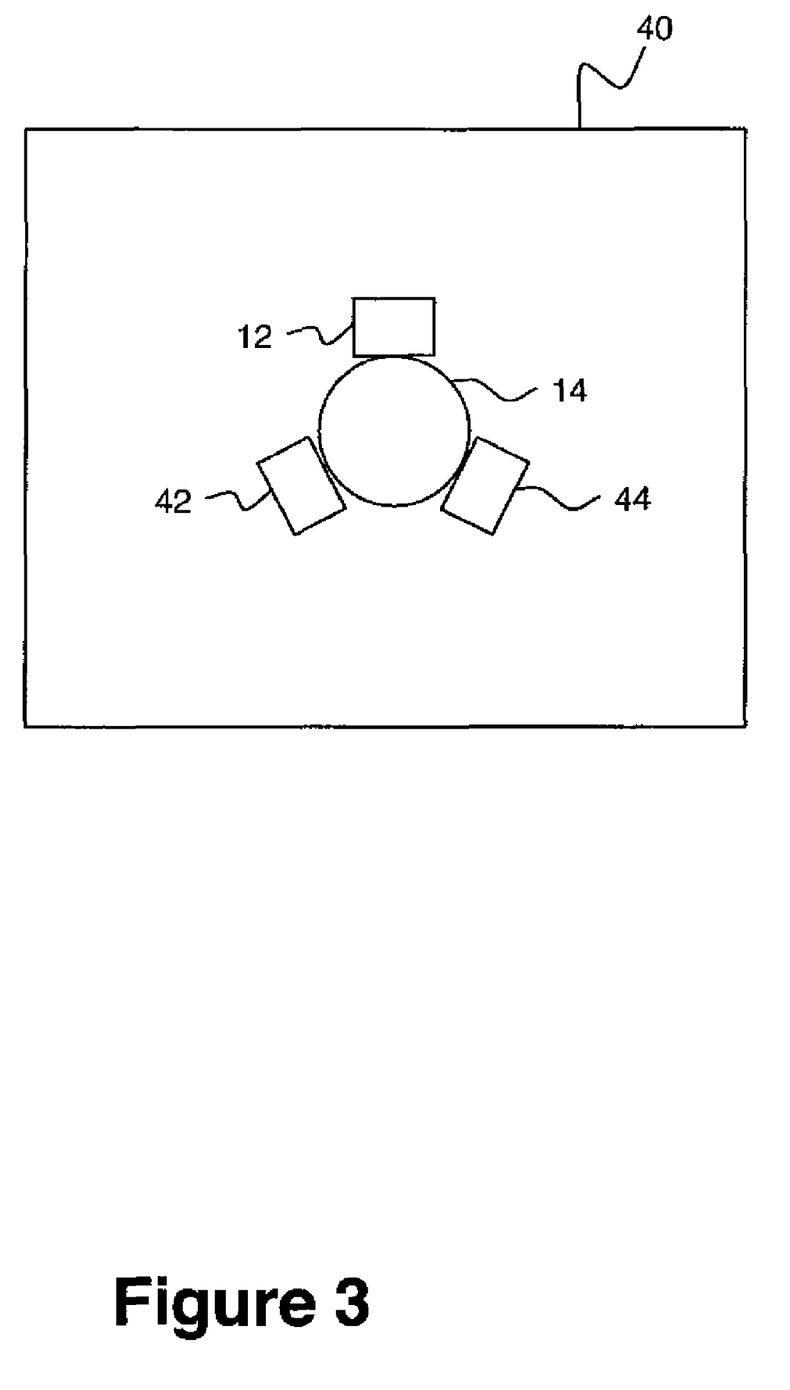
FIG. 3 is a top view diagram of a communication tower with three agile radio heads.

It is explicitly understood that a plurality of agile radio heads may be placed on communication tower 14. FIG. 3 shows a configuration 40 where the agile radio head 12 is shown with a second agile radio head 42 and a third radio head 44. This configuration allows for the range and/or direction of coverage of the agile radio heads to be adjusted independently. In an embodiment, the agile radio heads 12, 42, and 44 may correspond to about 120 degree sectors of coverage. Depending on how the agile radio heads 12, 42, and 44 are dynamically configured according to the present disclosure, the range of each sector may vary.

Since the agile radio heads can be configured through software, they can be dynamically configured based upon a plurality of circumstances. Examples of these include increased capacity based upon a temporary spike in demand, compensation for a failure of one or more towers, or any other change in operational requirements. In some contexts, a spike in demand may be referred to as an increase in capacity demand. In the example of the temporary spike in demand, if communication tower 14 is adjacent to a highway, communication tower 14 may experience a spike in demand during rush hour. During these times, the communication tower 14 may need to serve a small area with a very large demand. Therefore, communication tower 14 may be configured to allow for a smaller coverage area with a larger capacity.

Figure 4:
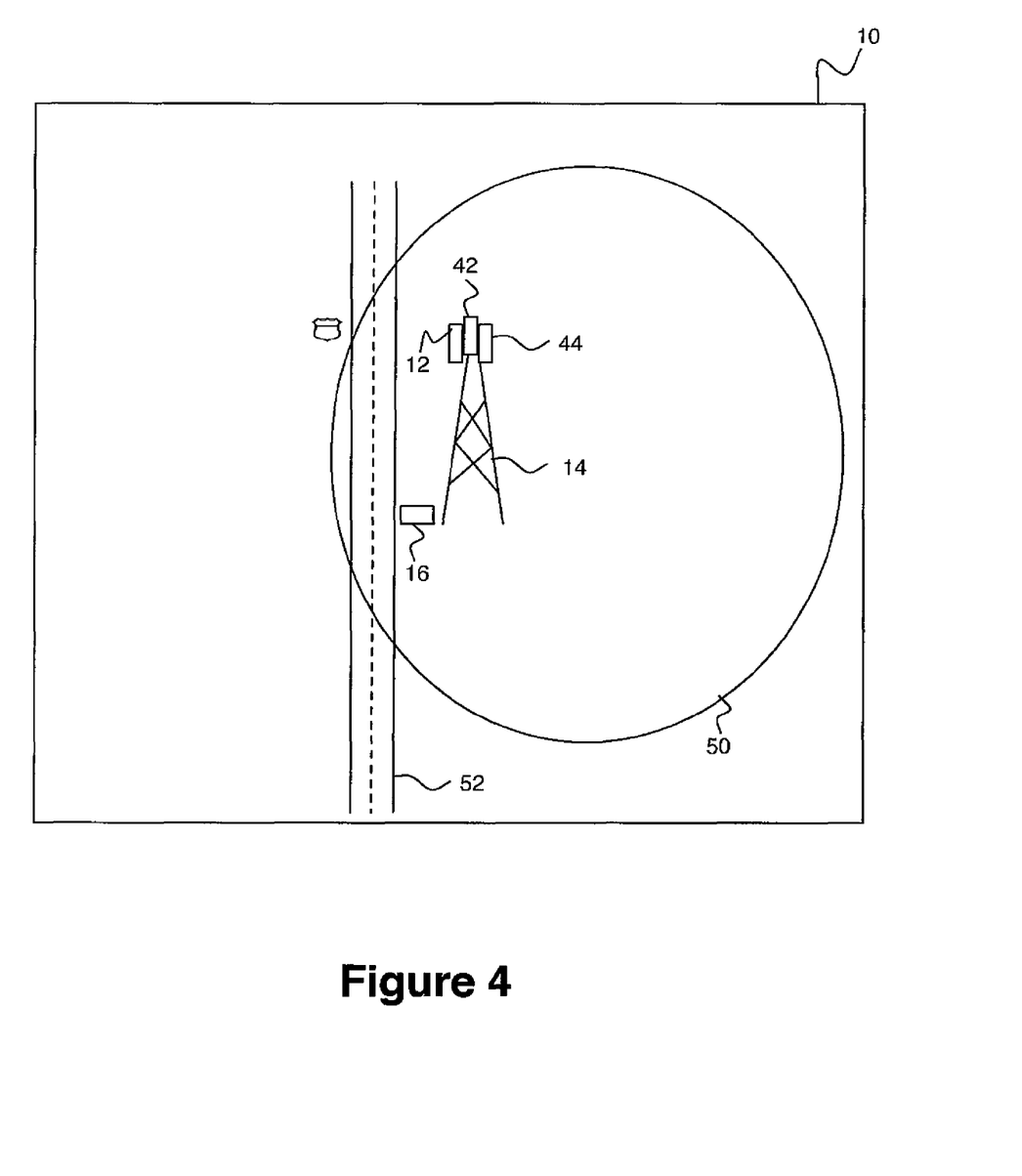
FIG. 4 is a block diagram of a system using a plurality of agile radio heads.

FIG. 4 is an example where configuration of one agile radio head (e.g., radio head 12) is dissimilar to one or more other radio heads at or near a common area (e.g., on a single tower). In this example, the coverage area 50 of the communication tower 14 may be customized for particular purposes. For instance, if a highway 52 is located next to communication tower 14, agile radio head 12 may be configured for mode two operation (e.g., maximum capacity near the roadway), while the area in the direction away from the highway (e.g. second agile radio head 42 and third agile radio head 44) may be operated in mode one (e.g., maximum coverage area).

Figure 5:
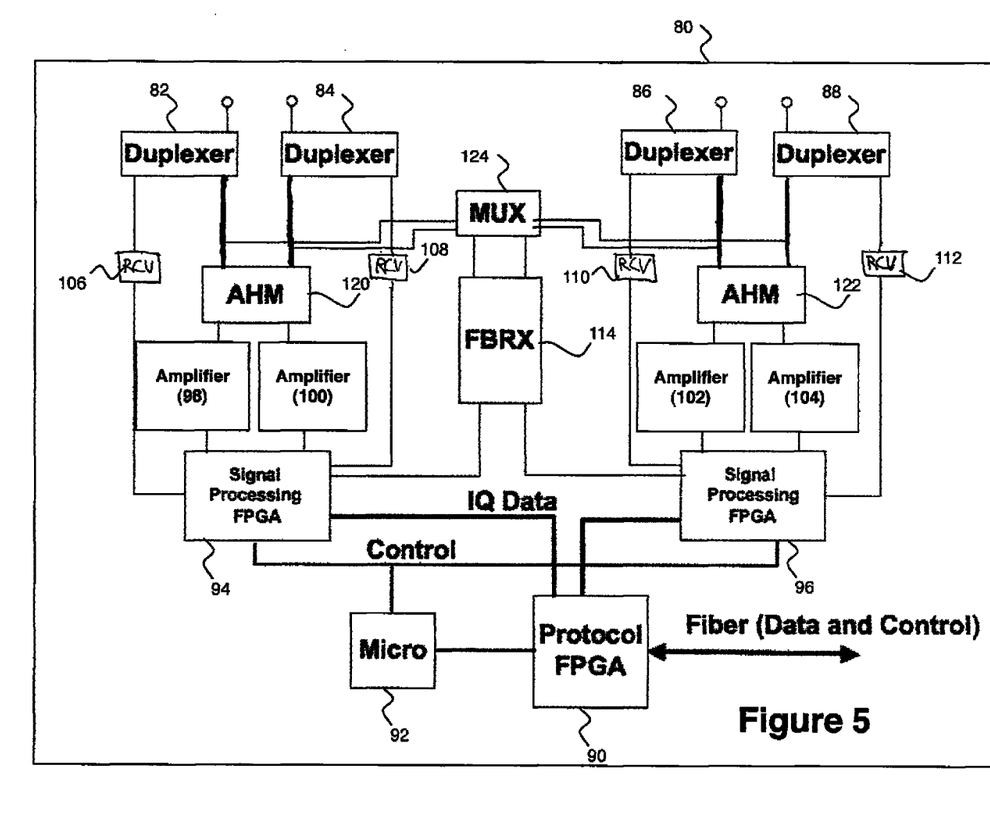
FIG. 5 is a block diagram of an agile radio head operating using Frequency Division Duplex.
Figure 6:
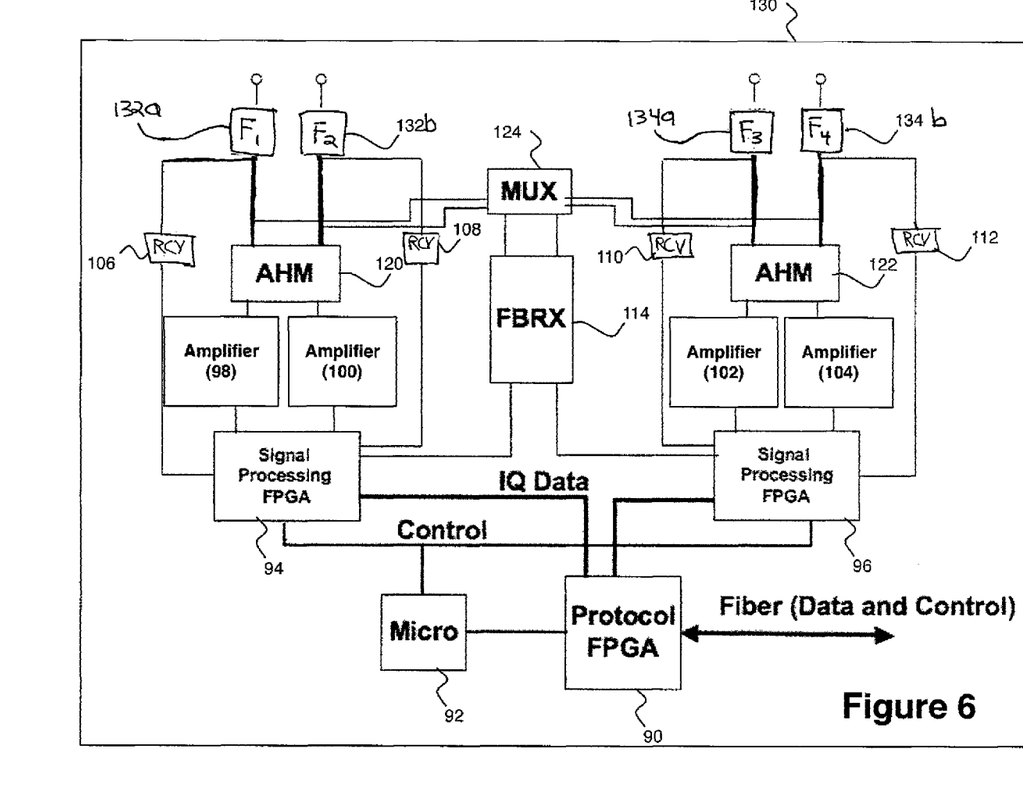
FIG. 6 is a block diagram of an agile radio head operating using Time Division Duplex.

As will be appreciated by one skilled in the art, when multiple signals are transmitted either concurrently or consecutively, an operation scheme may be used to prevent signals from suffering from interference created by other signals, thereby permitting signals to be sent and received accurately and reliably. Types of operation schemes include, but are not limited to, time division duplex and frequency division duplex operation schemes. In time division duplex, signals are sent and received at different times to avoid two signals interfering with each other. In frequency division duplex, signals are sent and received at different frequencies to avoid two signals from interfering with each other. While frequency division duplex and time division duplex operations are discussed in detail in this disclosure, it is expressly understood that any operation scheme could be used consistent with the present disclosure, including, but not limited to combinations of frequency division duplex and time division duplex. FIG. 5 and FIG. 6 are examples of configurations of the agile radio head using frequency division duplex and time division duplex, respectively.

FIG. 5 is a block diagram 80 of one implementation of the agile radio head 12 using frequency division duplex radio operation. In frequency division duplex radio operation the uplink and downlink operate continuously but in different frequency spectrum. In this example, data to be sent is first transmitted into a protocol field programmable gate array (FPGA) 90. The protocol FPGA 90 sends the data to either a first signal processing FPGA 94 or a second signal processing FPGA 96. The choice of which transmit chain the data is sent through will depend upon the operational mode of the agile radio head 12. Microprocessor 92 provides control data for the agile radio head 12. In some embodiments, the microprocessor 92 may be implemented as and/or integrated with an FPGA. In other embodiments, the functionality described herein as provided by microprocessor 92, the first signal processing FPGA 94, and the second signal processing FPGA 96 may be provided by other processor types, including application specific integrated circuits (ASICs), complex programmable logic devices (CPLDs), digital signal processors (DSPs), and other processors known to those skilled in the art. In some contexts, FPGAs, CPLDs, DSPs, and microprocessors may be referred to as programmable devices.

In the example embodiment illustrated by FIG. 5, there are four possible transmit and receive chains. A transmit chain is intended to include the components that extend from a signal processing FPGA to a duplexer that is used to prepare and transmit a signal from the agile radio head. The transmit chain may include a digital-to-analog converter (DAC) and an upconverter (not shown). One example of a transmit chain is found where a signal is transmitted to a first amplifier 98 from the first signal processing FPGA 94, amplified, and the signal is then transmitted to a first analog hybrid matrix (AHM) 120. The analog hybrid matrix is used to combine the signal being transmitted from the first amplifier 98 with the signal being transmitted by second amplifier 100. The first AHM 120 can be any N×N coupler, where N is an integer representing the number of transmit chains that may be combined. In this example, the first Signal Processing FPGA 94 would apply the inverse of the transfer function of the first AHM 120 to the baseband data, such that the RF signals arrive on the appropriate port of the first AHM 120 and be sent to the appropriate duplexer 82, 84 and antenna. A description of this system is provided more fully in U.S. Pat. No. 7,206,355 which is hereby incorporated by reference. This concept promotes N-transmitters operating as independent transmitters or to have their power combined onto a subset of outputs. In an embodiment depicted in FIG. 5, the first AHM 120 links amplifiers 98, 100 and is a 2×2 coupler. The transmitters comprising amplifiers 98, 100 can act as independent transmitters, propagating independent streams of data, or alternatively their power can be pooled onto one output port. Furthermore, it is possible to provide a majority of the RF power to a first output, for example to the first duplexer 82, and a smaller portion of the RF power to a second output, for example to the second duplexer 84. The signal leaves the first AHM 120 and is transmitted to the first duplexer 82 for transmission. Another transmission chain illustrated by FIG. 5 includes the first signal processing FPGA 94, a second amplifier 100, the first AHM 120, and a second duplexer 84. A third transmission chain illustrated by FIG. 5 includes the second signal processing FPGA 96, a third amplifier 102, a second AHM 122, and a third duplexer 86. A fourth transmission chain includes the second signal processing FPGA 96, a fourth amplifier 104, the second AHM 122, and a fourth duplexer 88.

FIG. 5 also includes four receive chains. A receive chain includes the elements in which a signal is received by the agile radio head. The first receive chain is where a signal comes into the first duplexer 82. The signal received by the first duplexer is prepared for amplification and transmitted into to a first receiver 106. The first receiver 106 amplifies the signal, down converts, filters, digitizes, and sends the received signal into the first signal processing FPGA 94. The first signal processing FPGA 94 transmits the processed signal to the protocol FPGA 90. A second similar receive chain is formed from of the second duplexer 84, a second receiver 108, the first signal processing FPGA 94, and protocol FPGA 90. A third similar receive chain is formed from of the third duplexer 86, a third receiver 110, the second signal processing FPGA 96, and the protocol FPGA 90. A fourth similar receive chain is formed from of the fourth duplexer 88, a fourth receiver 112, the second signal processing FPGA 96, and the protocol FPGA 90. It is to be appreciated that a greater or lesser number of transmit and/or receive chains can be provided in accordance with the teachings of the present disclosure.

Also shown in FIG. 5 is a multiplexer (MUX) 124 and a feedback receiver (FBRX) 114. The MUX 124 may be used to switch or select data streams from various elements, including, but not limited to, the first AHM 120 and the second AHM 122. In the example shown in FIG. 5, four signals are connected at the input of the MUX 124 switchable into two feedback signal paths, one connected to the second signal processing FPGA 94 and one connected to the first signal processing FPGA 90. The two selected feedback signals are sent from MUX 124 to FBRX 114. The FBRX 114 may use the feedback signals for a plurality of purposes, including, but not limited to baseband predistrortion and monitoring one or more AHM units. A more complete discussion of the FBRX 114 is found in the aforementioned U.S. Pat. No. 7,206,355, which has been incorporated by reference. The FBRX 114 may allow for improved power distribution within the agile radio head 12 by sampling signal from the first AHM 120 and the second AHM 122. It is explicitly understood that FBRX 114 could be substituted with other elements capable of monitoring at least one AHM, performing feedback signal processing, or enhancing the power distribution when used in combination with this disclosure. While the example shown in FIG. 5 has two feedback signals, it is expressly understood that any number of signals may be used with the disclosed AHM units, MUX 124 and FBRX 114.

If the agile radio head 12 is operating using agile radio operational mode one (e.g., maximum coverage area), the output power from the two amplifiers (first amplifier 98 and second amplifier 100 or third amplifier 102 and fourth amplifier 104) combines for increased coverage area.

The agile radio head 12 may be operated using operational mode two (e.g., maximum capacity mode), which may be used to provide additional capacity using a single frequency, or to allow for multiple carriers using different frequencies. For instance, in mode two, there may be four separate transmissions, one from each of the amplifiers. These transmissions may be at the same frequencies, or may be at two separate frequencies (the first duplexer 82 and the second duplexer 84 at a first frequency, and the third duplexer 86 and the fourth duplexer 88 at a second frequency). This may create a two carrier radio that may double the capacity of the agile radio head 12. It is understood that in the embodiment using the two carrier radio, each carrier is serviced by two transmitters and two receivers (2×2 multiple input multiple output (MIMO)). It is further understood that a voltage controlled oscillator (VCO) may be used and tuned to arbitrary frequency for non-contiguous channel allocations.

If the agile radio head 12 is operating using agile radio operational mode three (e.g., custom coverage), beam forming may be used for specific coverage profiles. Each of the transmit chains and receive chains in mode three use the same frequency. This operational mode may be used to communicate with a narrow area or to establish specialized communications links, as known to one skilled in the art. Beam forming using operational mode three is one example of changing the type of transmission from the agile radio head 12.

Each of these operational modes may be configured through modem 16. A computer may connect to modem 16 with a software key for programming the microprocessor 92 and/or one or more of the FPGAs and reconfigure the agile radio head to operate using a mode consistent with this disclosure. Since the microprocessor and/or the FPGA controls the operational mode of each of the systems, it is expressly understood that the modem may be used to program any specific operational mode. Two ways of programming the agile radio head are to select a pre-programmed scheme within the FPGA, or to program a new scheme into the FPGA. For instance, all three operational modes disclosed herein may be programmed into the agile radio head 12, and be selected by simply instructing the FPGA to operate using the preprogrammed operational scheme. In addition, the FPGA may be reprogrammed with a new scheme using modem 16. It is contemplated that there are many methods to switch the operation of the agile radio head 12 which may be used in combination with this disclosure.

FIG. 6 is a block diagram 130 of one implementation of the agile radio head 12 using a time division duplex radio operation. In this embodiment the uplink and downlink are time duplexed (the downlink and uplink functions are used at different times). FIG. 6 is similar to FIG. 5 (as previously described) except that the pair of duplexers 82 and 84 have been replaced by a pair of filters 132a and 132b and the second pair of duplexers 86 and 88 have been replaced by a second pair of filters 134a and 134b. This allows for the operation of the agile radio head using a time division duplex scheme, which scheme is well understood in the telecommunications art. While not illustrated in FIG. 6, it is understood that the transmitter and the receiver maybe coupled through a switch or circulator to promote time division duplexing operations.

Figure 7:
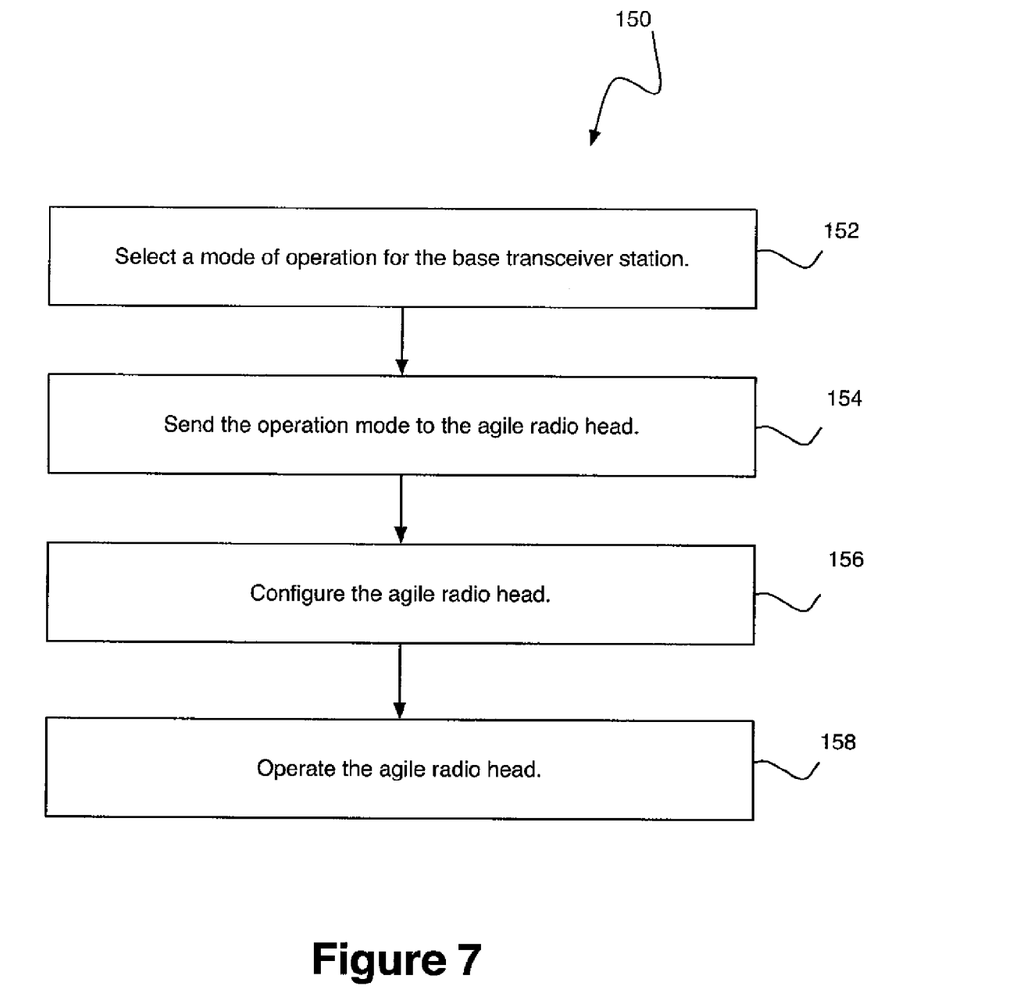
FIG. 7 is a flowchart of the operation of the agile radio head.

FIG. 7 is a flowchart 150 of one method of operating the agile radio head 12. In block 152, a mode is selected for the operation of the agile radio head. In block 154, the mode of operation is sent to the agile radio head. In block 156, the agile radio head 12 is configured with the new mode of operation. In block 158, the agile radio head 12 operates using the new mode of operation.

Figure 8:
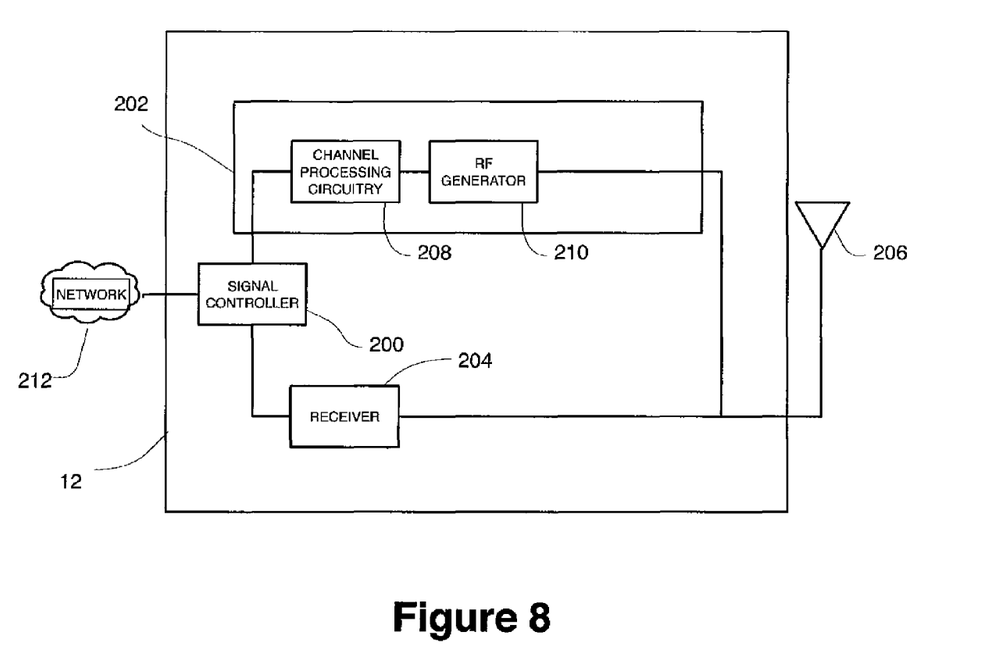
FIG. 8 is a block diagram of a base station unit.

FIG. 8 illustrates one embodiment of a base transceiver station that can be used with the disclosed agile radio heads. In this embodiment, the agile radio head 12 is a medium to high-power multi-channel, two-way radio in a fixed location. Typically it may be used by low-power, single-channel, two-way radios or wireless devices such as mobile phones, portable phones and wireless routers. The agile radio head 12 may comprise a signal controller 200 that is coupled to a transmitter 202 and a receiver 204. Transmitter 202 and receiver 204 (or combined transceiver) is further coupled to an antenna 206. In the agile radio head 12, digital signals are processed in signal controller 200. The digital signals may be signals for a wireless communication system, such as signals that convey voice or data intended for a mobile terminal (not shown). The agile radio head 12 may employ any suitable wireless technologies or standards such as 2G, 2.5G, 3G, GSM, IMT-2000, UMTS, iDEN, GPRS, 1xEV-DO, EDGE, DECT, PDC, TDMA, FDMA, CDMA, W-CDMA, LTE, TD-CDMA, TD-SCDMA, GMSK, OFDM, WiMAX, the family of IEEE 802.11 standards, the family of IEEE 802.16 standards, IEEE 802.20, etc. Signal controller 200 then transmits the digital signals to transmitter 202, which includes a channel processing circuitry 208. Channel processing circuitry 208 encodes each digital signal, and a radio frequency (RF) generator 210 modulates the encoded signals onto an RF signal. The resulting output signal is transmitted over antenna 206 to the mobile terminal. Antenna 206 also receives signals sent to the agile radio head 12 from the mobile terminal. Antenna 206 transmits the signals to receiver 204 that demodulates them into digital signals and transmits them to signal controller 200 where they may be relayed to an external network 212. The agile radio head 12 may also comprise auxiliary equipment such as cooling fans or air exchangers for the removal of heat from the agile radio head 12.

Figure 9:
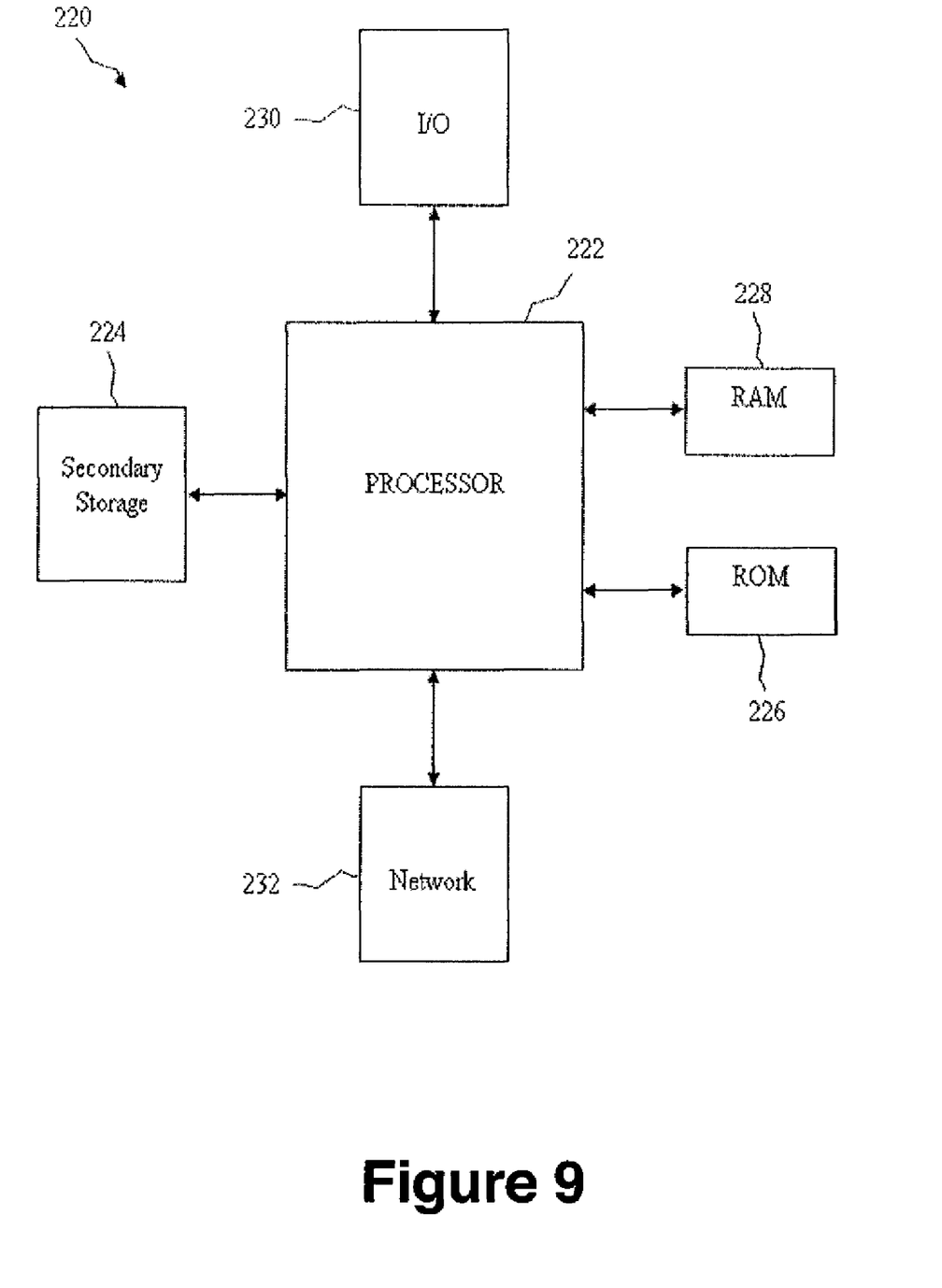
FIG. 9 is a block diagram of a general purpose computer.

Components of the system described above (e.g., modem 16, microprocessor 92, communication device 20, etc.) may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 220 includes a processor 222 (which may be referred to as a central processor unit or CPU) that is in communication with memory devices including secondary storage 224, read only memory (ROM) 226, random access memory (RAM) 228, input/output (I/O) devices 230, and network connectivity devices 232. The processor may be implemented as one or more CPU chips.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. The ROM 226 is used to store instructions and perhaps data which are read during program execution. ROM 226 is a non-volatile memory device which typically has a small memory capacity relative to the larger memory capacity of secondary storage. The RAM 228 is used to store volatile data and perhaps to store instructions. Access to both ROM 226 and RAM 228 is typically faster than to secondary storage 224.

I/O devices 230 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or WiMAX radio transceiver cards, and other well-known network devices. These network connectivity devices 232 may enable the processor 222 to communicate with an Internet or one or more intranets. With such a network connection, it is contemplated that the processor 222 might receive information from the network, or might output information to the network in the course of performing the above-described method steps. Such information, which is often represented as a sequence of instructions to be executed using processor 222, may be received from and outputted to the network, for example, in the form of a computer data signal embodied in a carrier wave.

Such information, which may include data or instructions to be executed using processor 222 for example, may be received from and outputted to the network, for example, in the form of a computer data baseband signal or signal embodied in a carrier wave. The baseband signal or signal embodied in the carrier wave generated by the network connectivity devices 232 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 222 executes instructions, codes, computer programs, scripts which it accesses from hard disk, floppy disk, optical disk (these various disk based systems may all be considered secondary storage 224), ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors. While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of broader terms such as "comprises", "includes", "having", etc. should be understood to provide support for narrower terms such as "consisting of", "consisting essentially of", "comprised substantially of", etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

The invention claimed is:

1. A system for providing wireless communication, the system comprising:
 a radio transceiver comprising a plurality of configurable receivers and transmitters, wherein each transmitter comprises an amplifier, wherein a first plurality of the amplifiers are coupled to a first analog hybrid matrix that combines the outputs of each of the first plurality of amplifiers and that provides an output to a first plurality of duplexers, wherein the radio transceiver comprises a first signal processor that receives a transmit signal, that processes the transmit signal according to a first transfer function that causes the outputs of the first plurality of amplifiers to be routed by the first analog hybrid matrix to one of the first plurality of duplexers when the first signal processor is selected to a first operational mode, and that processes the transmit signal according to a second transfer function that causes the outputs of the first plurality of amplifiers to be routed by the first analog hybrid matrix to be distributed among all of the first plurality of duplexers when the first signal processor is selected to a second operational mode;

a programmable processor, wherein the programmable processor is operable to select the first signal processor to the first operational mode or the second operational mode.

2. The system of claim 1, wherein the programmable processor receives program inputs from a modem and selects the first signal processor to the first operational mode or the second operational mode based on the program inputs.

3. The system of claim 1, wherein the first signal processor is at least one of a field programmable gate array, an application specific integrated circuit, a complex programmable logic device, and a digital signal processor.

4. The system of claim 1, wherein the first operational mode decreases the capacity and increases the range of the radio transceiver.

5. The system of claim 1, wherein the second operational mode decreases the range and increases the capacity of the radio transceiver.

6. The system of claim 1, wherein the programmable processor is further operable to select the first signal processor to a third operational mode that uses one of beam forming and MIMO.

7. The system of claim 1, wherein the radio transceiver comprises a second signal processor that receives a second transmit signal, that processes the second transmit signal according to the first transfer function that causes the outputs of a second plurality of amplifiers to be routed by a second analog hybrid matrix to one of a second plurality of duplexers when the second signal processor is selected to the first operational mode, and that processes the second transmit signal according to the second transfer function that causes the outputs of the second plurality of amplifiers to be routed by the second analog hybrid matrix to be distributed among all of the second plurality of duplexers when the second signal processor is selected to the second operational mode; and wherein the programmable processor is operable to select the second signal processor to the first operational mode or the second operational mode.

8. The system of claim 1, wherein the programmable processor is a microprocessor.

9. A method for configuring a radio head, comprising:
selecting a first operation mode for a radio head from a prescribed set of operation modes of the radio head;
inputting the first operation mode into the radio head;
in response to the first operation mode input, a signal processor processing a transmit signal according to a first transfer function that causes the outputs of a plurality of amplifiers to be routed by an analog hybrid matrix to a single duplexer and output as a combined transmit signal;
selecting a second operation mode for the radio head from the prescribed set of operation modes of the radio head;
inputting the second operation mode into the radio head; and
in response to the second operation mode input, the signal processor processing the transmit signal according to a second transfer function that causes the outputs of a plurality of amplifiers to be routed by the analog hybrid matrix to a plurality of duplexers and output as separate transmit signals.

10. The method of claim 9, further comprising identifying a change in operational conditions, wherein selecting the operation mode of the radio head is based upon the change in operational conditions.

11. The method of claim 10, wherein the change in operational conditions is an increase in capacity demand.

12. The method of claim 9, wherein the operational mode is input into the radio head using a software key to activate a preprogrammed operational mode.

13. The method of claim 9, wherein the operational mode is input into the radio head by programming at least one programmable device in the radio head.

14. The system of claim 9, wherein selecting the operational mode for the radio head further comprises selecting the operational mode for the radio head based upon real-time operational conditions.

15. A method for configuring a radio head, comprising:
operating a first radio head with a first operational mode, wherein the first operational mode has a first range and a first coverage area and wherein the first operational mode is implemented in part by a signal processor implementing a first transfer function that results in outputs of a plurality of amplifiers being summed to produce a single transmitted signal;
detecting a change in operational conditions;
compensating for the change in operational conditions by selecting a second operational mode; and
operating the first radio head with the second operational mode, wherein the second operational mode has a second range and a second coverage area and wherein the second operational mode is implemented in part by the signal processor implementing a second transfer function that results in outputs of a plurality of amplifiers being routed to produce a plurality of separately transmitted signals.

16. The method of claim 15, wherein the change in operational conditions is a failure of a second radio head.

17. The method of claim 16, wherein the detection of a change in operational conditions is performed through a notification provided by the second radio head.

18. The method of claim 15, wherein the change in operational conditions is due to a change in usage of the first radio head.

19. The method of claim 15, wherein the first signal processor is one of a field programmable gate array, an application specific integrated circuit, a complex programmable logic device, and a digital signal processor.

20. The method of claim 15, wherein the first radio head is part of a base transceiver station.

* * * * *